(12) United States Patent
Bhatnagar et al.

(10) Patent No.: US 9,619,912 B2
(45) Date of Patent: Apr. 11, 2017

(54) ANIMATED TRANSITION FROM AN APPLICATION WINDOW TO ANOTHER APPLICATION WINDOW

(75) Inventors: Arvin Bhatnagar, Powell, OH (US); Anthony Marco Lemus, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 432 days.

(21) Appl. No.: 13/410,741

(22) Filed: Mar. 2, 2012

(65) Prior Publication Data
US 2013/0229427 A1  Sep. 5, 2013

(51) Int. Cl.
*G06T 13/00* (2011.01)
*G09G 5/14* (2006.01)

(52) U.S. Cl.
CPC .............. *G06T 13/00* (2013.01); *G09G 5/14* (2013.01); *G09G 2340/10* (2013.01); *G09G 2340/14* (2013.01)

(58) Field of Classification Search
CPC .............................. G06F 3/0481; G06F 3/0483
See application file for complete search history.

(56) References Cited

U.S. PATENT DOCUMENTS

| | | | | |
|---|---|---|---|---|
| 5,353,391 A * | 10/1994 | Cohen et al. | ............. | 345/619 |
| 5,898,435 A * | 4/1999 | Nagahara | ............. | G06F 3/04815 715/841 |
| 5,999,173 A * | 12/1999 | Ubillos | ............. | 715/724 |
| 6,121,963 A * | 9/2000 | Ange | ............. | 715/202 |
| 6,189,064 B1 * | 2/2001 | MacInnis et al. | ............. | 710/244 |
| 7,382,606 B2 * | 6/2008 | Tracy | ............. | G06F 1/1616 312/223.3 |
| 8,006,192 B1 * | 8/2011 | Reid et al. | ............. | 715/762 |
| 8,081,197 B1 * | 12/2011 | Jude et al. | ............. | 345/628 |
| 9,010,753 B2 * | 4/2015 | Shibasaki | ............. | B65H 29/14 270/58.07 |
| 2002/0061065 A1 * | 5/2002 | Moore | ............. | 375/240.13 |
| 2004/0113866 A1 * | 6/2004 | Aoki | ............. | B60K 35/00 345/7 |
| 2005/0059432 A1 * | 3/2005 | Choi | ............. | 455/563 |
| 2008/0030504 A1 * | 2/2008 | Brunner et al. | ............. | 345/473 |
| 2008/0184360 A1 * | 7/2008 | Kornilovsky | ............. | G06F 3/0362 726/17 |

(Continued)

OTHER PUBLICATIONS

Apple Inc; Mac OS X Human Interface Guidelines; Jul. 26, 2011.*

(Continued)

*Primary Examiner* — Frank Chen (57) ABSTRACT

A method includes receiving an input signal. The input signal includes a request to transition from a start window to an auxiliary window. The start window is identified. The start application is initially in an active state. The auxiliary window is identified. The auxiliary window is initially in an inactive state. A start window overlay is determined based on the start window. The start window overlay includes a visual copy of the start window. An auxiliary window overlay is determined based on the auxiliary window. The method includes transitioning from the start window to the auxiliary window in an active state based on the start window overlay and the auxiliary window overlay.

20 Claims, 10 Drawing Sheets

(56) References Cited

U.S. PATENT DOCUMENTS

2008/0279585 A1* 11/2008 Furuichi .......... G03G 15/04036
399/118
2010/0107067 A1* 4/2010 Vaisanen ...................... 715/702
2012/0131501 A1* 5/2012 Lazaridis et al. ............. 715/804
2013/0100170 A1* 4/2013 Matsumura .......... G01B 11/024
345/672

OTHER PUBLICATIONS

Patterson; Reducing Noise in Images with Photoshop; https://web.archive.org/web/20100411215024/http://www.photoshopessentials.com/photo-editing/reduce-noise/; captured by the Internet Wayback Machine on Apr. 11, 2010.*

* cited by examiner

ANIMATED TRANSITION FROM AN APPLICATION WINDOW TO ANOTHER APPLICATION WINDOW

BACKGROUND INFORMATION

Computing devices sometimes include a graphical user interface (GUI) that is used to present applications to users. Each application may receive input to provide different functions through different user interface elements displayed in the GUI. In some instances, the computing devices may receive additional input via associated devices, such as sensors, keyboards, computer mice, etc.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for providing an animated transition from one application window to another application window. In some implementations, the transition may be from a start window to an associated auxiliary window. The associated auxiliary window may include information related to the application and information displayed in the start window, such as metadata and or indicators regarding specific functions that are available for the application.

In addition, embodiments described herein relate to devices, methods, and systems for providing an animated transition that corresponds to the input signal, received via keyboard, mouse, motion sensors, etc., which initiates the transition.

Figure 1:
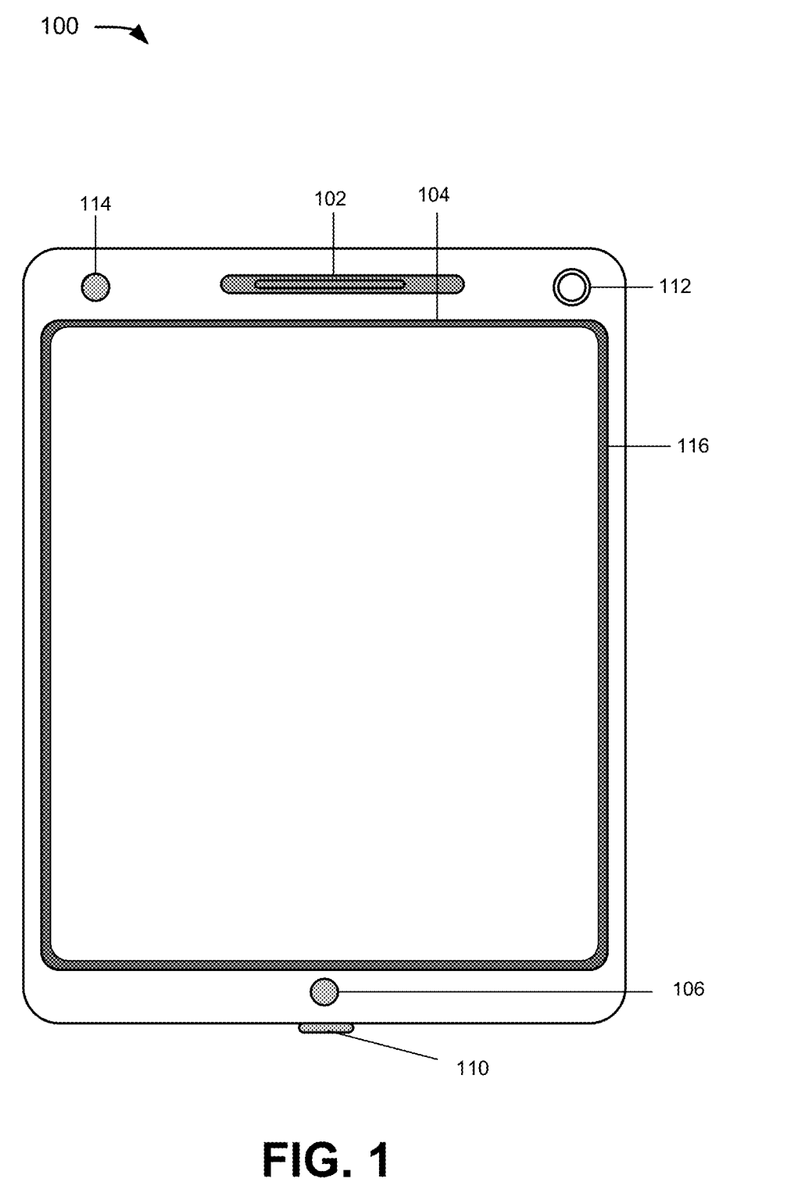
FIG. 1 is a diagram of an exemplary device in which methods and systems described herein may be implemented.

FIG. 1 is a diagram of an exemplary device 100 in which methods and systems described herein may be implemented. Although illustrated as a tablet or touch screen device, device 100 may include any of the following devices: an electronic notepad, a tablet computer, a laptop, and/or a personal computer; a personal digital assistant (PDA) that can include a telephone; a mobile telephone; a cellular phone; a personal communications system (PCS) terminal that may combine a cellular radiotelephone with data processing, facsimile, and/or data communications capabilities; a gaming device or console; a peripheral (e.g., wireless headphone); a digital camera; or another type of computational or communication device.

In this implementation, device 100 may take the form of a tablet computer. As shown in FIG. 1, device 100 may include a speaker 102, a touchscreen display 104, control button 106, a microphone 110, sensors 112, a front camera 114, and a housing 116. Speaker 102 may provide audible information to a user of device 100. Although device 100 is shown with particular components and a particular configuration, device 100 may include fewer, more or different components, such as additional sensors, input devices, and may include associated devices (e.g., a stylus) etc.

Display 104 may provide visual information to the user, such as an image of a caller, video images, or pictures. In addition, display 104 may include a touchscreen for providing input to device 100. Display 104 may provide hardware/software to detect the coordinates of an area that is touched by a user. For example, display 104 may include a display panel, such as a liquid crystal display (LCD), organic light-emitting diode (OLED) display, and/or another type of display that is capable of providing images to a viewer. Display 104 may include a transparent panel/surface for locating the position of a finger or an object (e.g., stylus) when the finger/object is touching or is close to display 104.

Control button 106 may permit the user to interact with device 100 to cause device 100 to perform one or more operations, such as place or receive a telephone call, input data to device 100, manipulate user interface elements, etc. In some implementations, control buttons 106 may include a telephone keypad (not shown) or an alphanumeric keyboard. Microphone 110 may receive audible information from the user. Sensors 112 may collect and provide, to device 100, information (e.g., acoustic, infrared, etc.) that is used to aid the user in capturing images or in providing other types of information (e.g., a distance between a user and device 100). Front camera 114 may enable a user to view, capture and store images (e.g., pictures, video clips) of a subject in front of device 100. Housing 116 may provide a casing for components of device 100 and may protect the components from outside elements.

In implementations described herein, an animated transition from a start window to an auxiliary window, in a GUI of device 100, may be provided using overlays of both windows and may provide an animated transition that is seamless from a user's viewpoint. Additionally, the animated transition may be modeled to simulate a visual representation of a physical response to an input provided by the user.

FIGS. 2A-2E illustrate an exemplary embodiment of a transition from a first application window to a second application window, in this instance from a start window 202 to an auxiliary window 204. Windows 202 and 204 include a transition button 210. The transition illustrated in and described with respect to FIGS. 2A-2E is a visual transition of displayed images that may be presented on a display of a computing device, such as device 100, and is for illustrative purposes. Other configurations may be implemented. For example, windows 202 and 204 may include additional, fewer and/or different features than those depicted in FIGS. 2A-2E and provide additional, fewer and/or different options than those depicted in FIGS. 2A-2E.

From the user's perspective, one application window (start window 202) is replaced by another application window (auxiliary window 204) in a seamless transition that may include animated movement of both windows 202 and 204 (including layers that may form the windows 202 and 204). As used herein, an application window is a container for user interface elements, while a layer is a type of user interface element (e.g., an image) within a window. The user may view start window 202 transitioning from, and auxiliary window 204 transitioning into, the GUI of device 100 on display 116. For example, start window 202 may appear to swivel on a fulcrum to reveal auxiliary window 204 on a reverse side of start window 202 (which may be out of sight at the end of the transition). In another example, start window 202 may turn a page to reveal auxiliary window 204. In yet another example, start window 202 may appear to open (e.g., in a similar manner to a curtain(s) or door(s)) to reveal auxiliary window 204. In any event, the animated transition from start window 202, as shown in FIG. 2A, to auxiliary window 204, as shown in FIG. 2E, may be implemented using start window overlay 212 and auxiliary window overlay 214 as described with respect to FIGS. 2B to 2D.

Figure 2A:
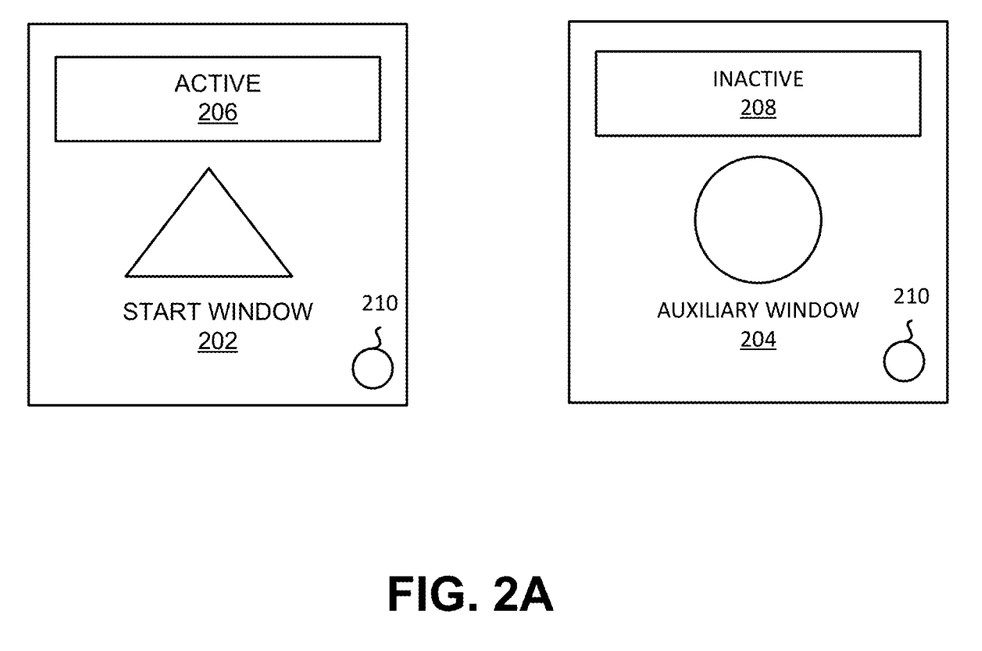
FIGS. 2A-2E illustrate an exemplary embodiment of a transition from a start window to an associated auxiliary window.

Start window 202 and auxiliary window 204 are shown in FIG. 2A. Start window 202 and auxiliary window 204 may be application windows that display information and features based on particular applications, such as a word processing application (e.g., Microsoft Word document), a digital photograph application, a browser application, a media manager application, a computing desktop, etc. Start window 202 may display an application and auxiliary window 204 may display information related to the application and information displayed in start window 202, such as metadata or information regarding specific functions that are available for the application. Auxiliary window 204 may also include control values for the application, and elements of the application, included in start window 204, for example as described with respect to FIGS. 3A-3C hereinbelow. The control values included in auxiliary window 204 may be adjusted by a user to change corresponding elements in start window 202.

According to one implementation, start window 202 for a word processing application may display a word processing document and auxiliary window 204 may display associated document information, such as an author, a modification date, word count, document format options (e.g., page setup, header footer formatting), etc. In another implementation, start window 202 for a digital photograph application may display a digital photograph and auxiliary window 204 may display information about the photograph, such as a photograph date, pixel dimensions, geographical information, camera data, etc. In a further implementation, start window 202 for the browser application may be a browser Web page and auxiliary window 204 may display hypertext markup language (HTML) code for the browser, browsing history, bookmarks, related Web pages, site architecture, etc. Desktop application may have a desktop as start window 202 and ancillary information, such as system functions, user information, etc., displayed in auxiliary window 204.

Application windows 202 and 204 may each have an activity status, either active 206 or inactive 208. An application window that is active 206 may be visible in the GUI of an associated device (e.g., in display 116 of device 100) and provide associated functionality for the application (e.g. via user interface elements, such as icons, hyperlinks, embedded code, digital folders, etc.). The device may also receive input from the user in association with the displayed application window when the application window is active (e.g., a particular key stroke combination may highlight an item in the application window). An application window that is inactive 208 may not be displayed to the user. Associated functionality for the inactive application window may not be available. Initially, start window 202 may be active 206 and auxiliary window may be inactive 208 as shown in FIG. 2A. In other words, start window 202 may be displayed on display 116 of device 100 prior to receipt of an input signal from a user. Auxiliary window 208 is stored in memory at that instant and functionality associated with auxiliary window 208 may not be accessed at that time.

The user may initiate a transition from start window 202 to auxiliary window 204 by providing an input signal that includes a request for a transition from start window 202 to auxiliary window 204. For example, the user may provide the input signal by clicking on transition button 210 (e.g., in a displayed application window) or by a pressing a key or combination of keys associated with the transition function (e.g. control/alt/page up) on the associated device 100. Alternatively, the user may provide the input signal based on motion detected by motion sensors associated with device 100. In another implementation, the user may provide the input signal via voice commands (e.g., an appropriate corresponding spoken command, such as "related information", "next page", and "auxiliary information"). The input signal may include a directional component (e.g., within a field of detection of motions sensors associated with device 100 or along a touchscreen display of device 100). Device 100 may identify this directional component.

Figure 2B:
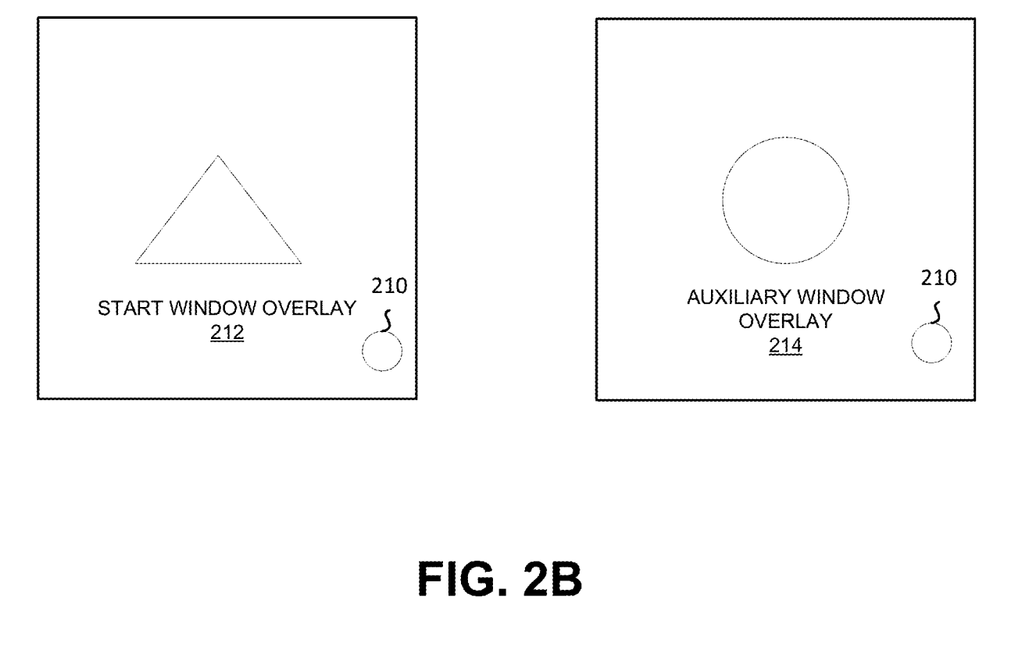

FIG. 2B shows start window overlay 212 and auxiliary window overlay 214. Device 100 may determine window overlays 212 and 214 based on application windows 202 and 204, respectively. In essence, start window overlay 212 may be a visual copy (e.g., a "screen shot") of start window 202 and auxiliary window overlay 214 may be a visual copy of auxiliary window 204. Window overlays 212 and 214 may not include functionality associated with application windows 202 and 204 and user interface elements represented in window overlays 212 and 214. Start window overlay 212 may be placed over (or replace) start window 202. From the user's perspective, there is no change in the displayed window when start window overlay 212 replaces start window 202.

Figure 2C:
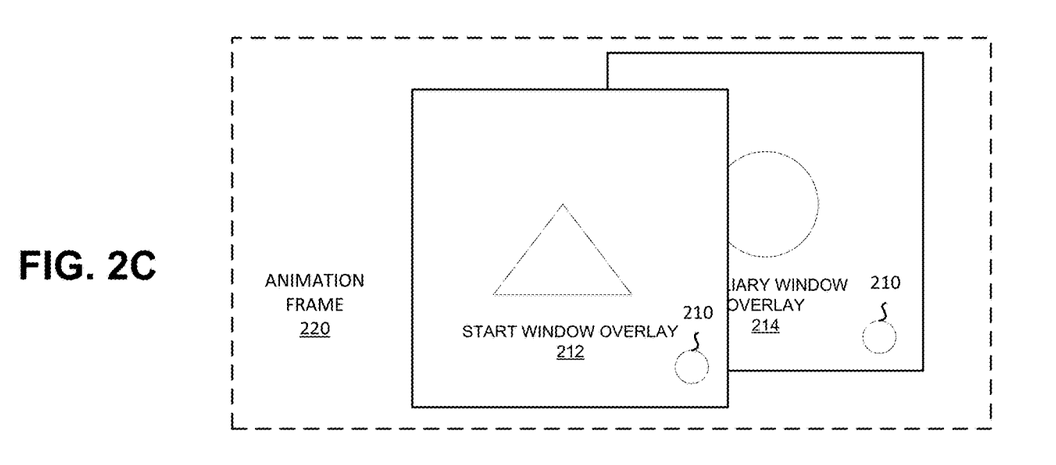
Figure 2D:
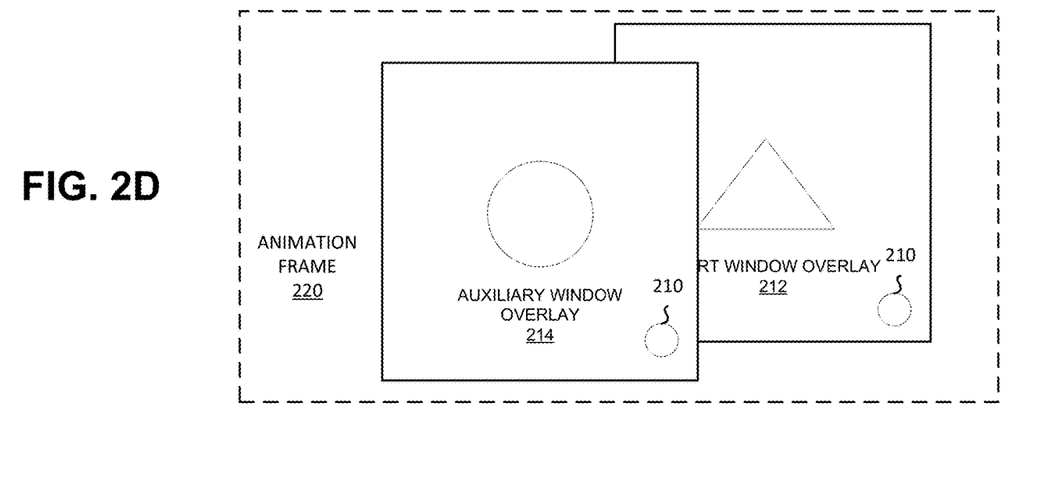
Figure 2E:
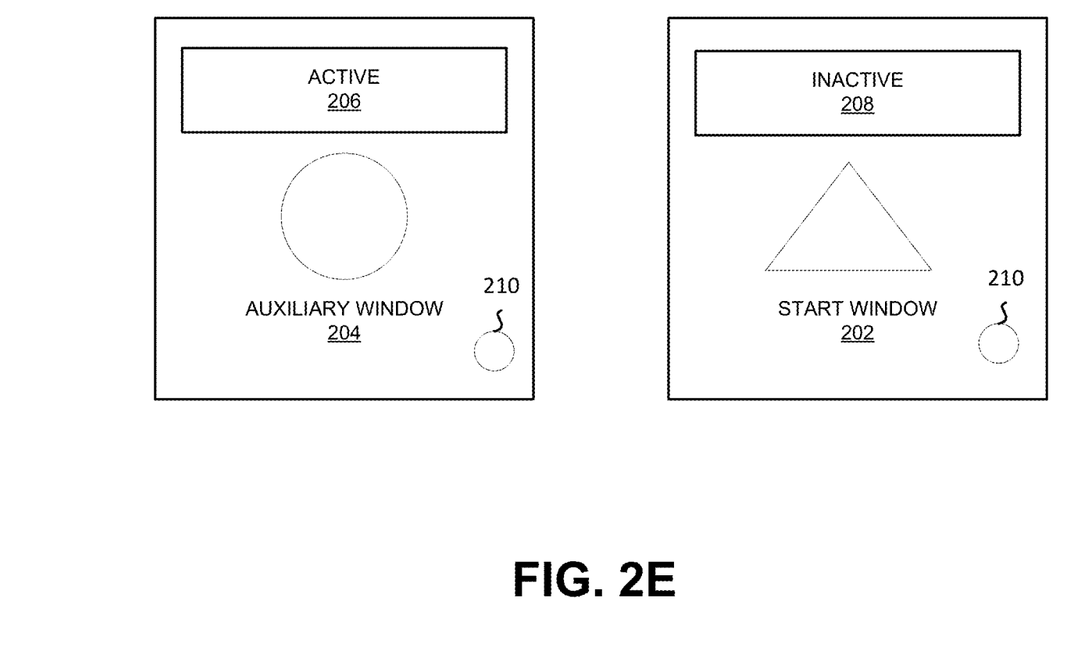

FIGS. 2C and 2D represent an animated transition from start window overlay 212 to auxiliary window overlay 214. FIG. 2C shows start window overlay 212 and auxiliary window overlay 214 in animation frame 220. Animation frame 220 may be an invisible frame of reference in which both window overlays 212 and 214 are positioned. Window overlays 212 and 214 (and the layers that are included in each window overlay) may be manipulated with respect to each other in animation frame 220, for example, using application programming interfaces (APIs) to animate and transition a layer or multiple layers within window overlays 212 and 214. For example, the transition may be animated using JavaScript APIs, Apple iOS APIs, etc. The size, perspective, angle, transparency/opacity, motion, etc. of window overlays 212 and 214 may be manipulated to provide a visual effect of an animated transition from start window overlay 212 to auxiliary window overlay 214 in animation frame 220.

According to one implementation, directional components (i.e., motion vectors) of the visual effect associated with the transition from start window overlay 212 to auxiliary window overlay 214 may be determined based on directional components of the input signal. For example, directional components of the user's motion may be factored into the motion vectors associated with a visual effect of window overlays 212 and 214 reversing (i.e., a flip card effect) on display 116. The directional component of the input signal may also be used to determine selection of a particular auxiliary window 204 from a group of available auxiliary windows 204. For example, different application windows 204 may be associated with an upward, a downward and a horizontal motion of a cursor beginning at transition button 210. The user may select a particular application window 204 by an upward flick from transition button 210.

FIG. 2D shows auxiliary window overlay 214 in an active status 206 and start window overlay 212 in an inactive status 208. From the user's perspective auxiliary window overlay 214 has replaced start window 202. However, auxiliary window overlay 214 may not provide functionality associated with user interface elements represented in auxiliary window overlay 214. Following the transition from start window overlay 212 to auxiliary window overlay 214, auxiliary window overlay 214 may be replaced by auxiliary window 204.

FIG. 2E shows auxiliary window 204 in an active status 206 and start window 202 in an inactive status 208. Auxiliary window 204 is visible to the user and user interface elements in auxiliary window 204 may provide associated functionality when receiving corresponding input from the user. For example, a user may return to start window 202 using transition button 210 from auxiliary window 204. Auxiliary window 204 may also include user interface elements that provide further functionality, such as links to related information for start window 202.

Although the transition between application windows is described with respect to start window 202 and associated auxiliary window 204, the transition described may be implemented between one or more application windows based on different relationships between the application windows (e.g., application windows may be sequential, part of a group, tangentially related, etc.).

Figure 3A:
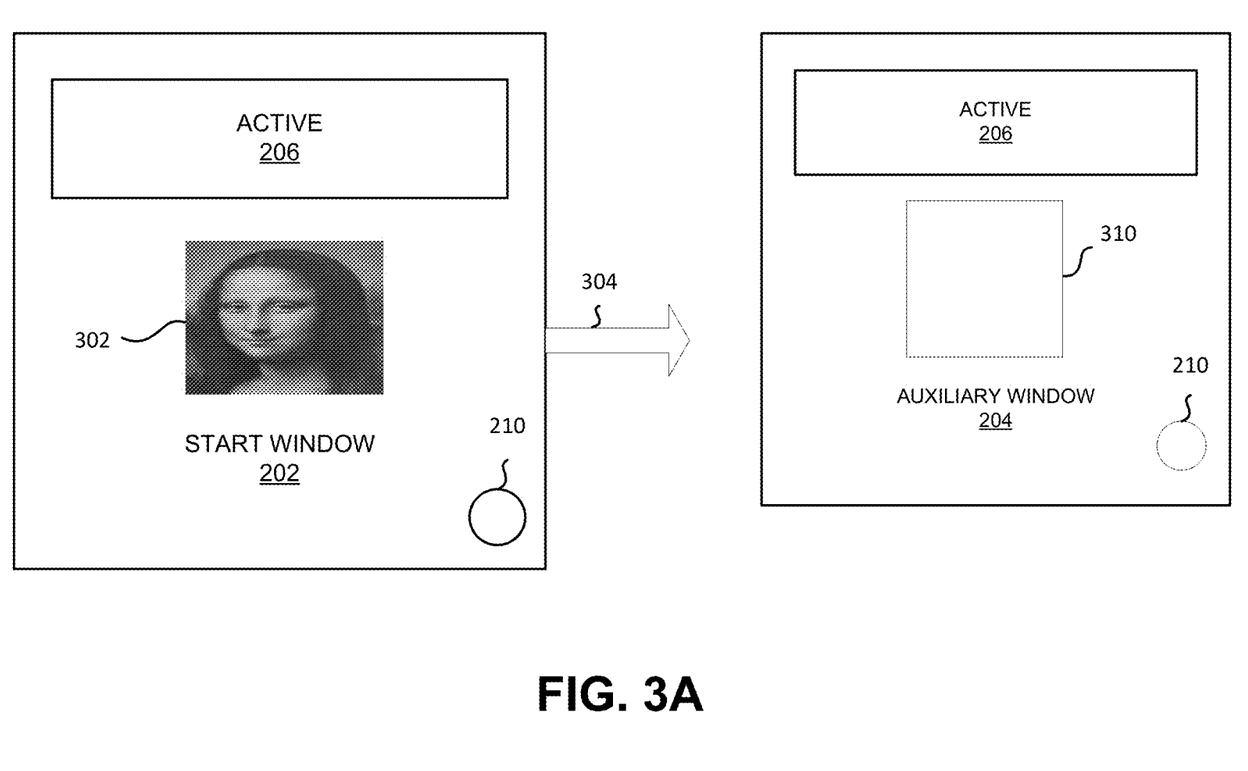
FIGS. 3A-3C illustrate a control relationship between a start window and an auxiliary window.
Figure 3B:
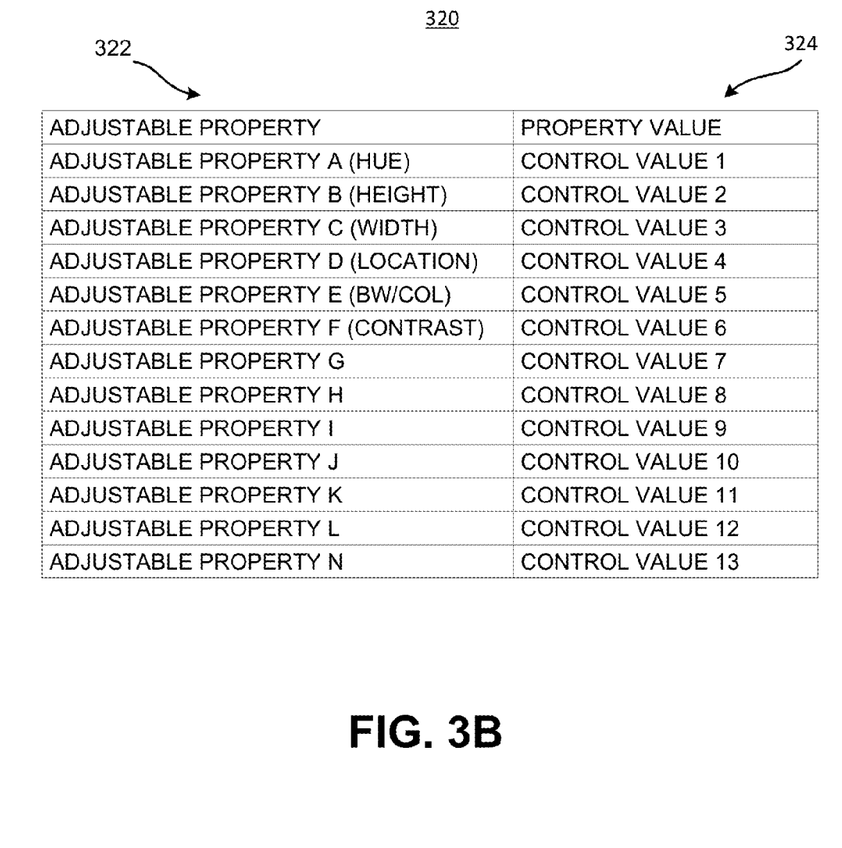
Figure 3C:
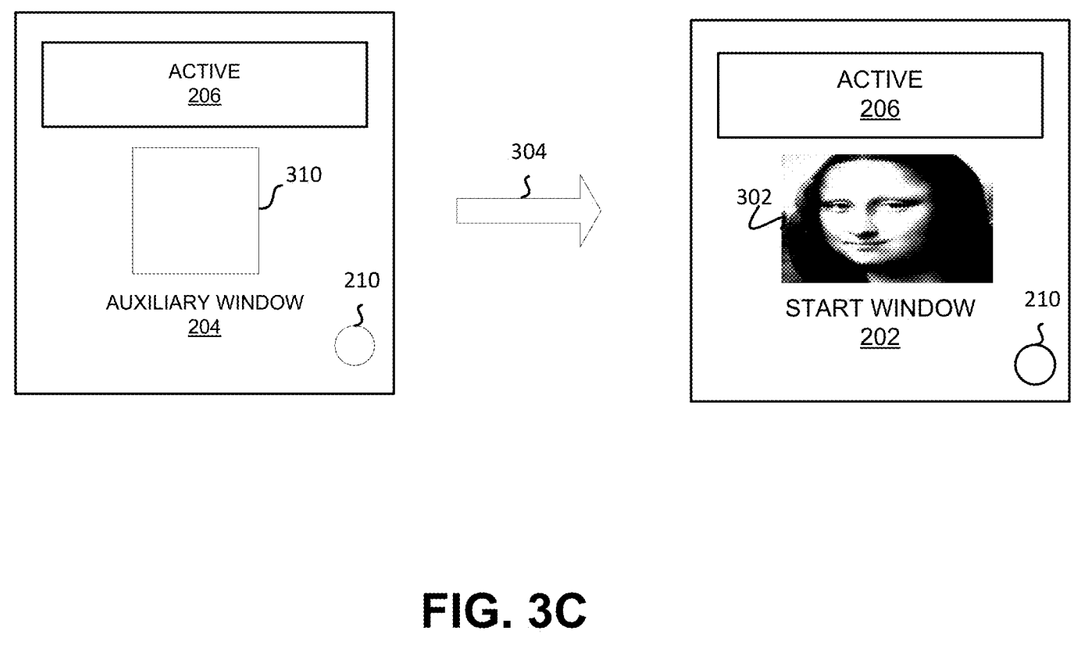

FIGS. 3A-3C illustrate an exemplary embodiment of a control relationship between start window 202 and associated auxiliary window 204. Although the relationship between start window 202 and associated auxiliary window 204 is described with respect particular adjustable properties of start window 202, and is for illustrative purposes. Other configurations may be implemented. For example, start window 202 and associated auxiliary window 204 may have different properties and produce different corresponding effects than those depicted in FIGS. 3A-3C.

As shown in FIG. 3A, start window 202 may have initial properties and functions and include particular elements, such as element 302. Element 302 may be a layer or an object displayed in start window 202. For example, element 302 may be an image. A user may initiate an animated transition 304 from start window 202 in an active state 206 to auxiliary window 204 in the active state 206. Auxiliary window 204 may include an interface for presenting or manipulating settings for the application associated with start window 202. For example, where start window 202 is a photo viewing application window presenting an image, auxiliary window 204 may include control values, in this instance image adjustment controls, such as contrast, brightness, sharpness, hue, crop image, etc. for adjusting the image presented in start window 202. Alternatively, auxiliary window 204 may include metadata information associated with the image presented in start window 202, such as file name information, date and time information, geotagging information, image resolution, etc.

FIG. 3B depicts a table 320 representing information presented in auxiliary window 204. As shown, table 320 includes a number of properties 322 (e.g., individual adjustable properties A-N) of elements 302 displayed in start window 202. Properties 322 may include aspects of elements that are presented in start window 202, such as color, brightness, size, location, relationships to other elements (e.g., images may share a particular contrast setting within a window), etc., and may have an associated control value 324 (values 1-13, representing, for example, a spectrum of colors where the property 322 is color). For example, adjustable properties A to F are indicated in brackets as hue, height, width, location, black and white or color, and contrast respectively of element 302, in this instance a picture image. In another example, start window 202 may be a word processing application and control values 324 may be document format options. Each control value 324 or a combination of control values 324 may represent a setting of start window 202. A user may input changes to values 324.

The user may transition 304 from auxiliary window 204 in an active state 206 to start window in an active state 206, as shown in FIG. 3C, after changing control values 324 of particular properties 322 of the elements 302. The changes in values 324 may be reflected in aspects of elements 302 in start window 202 after the transition 304 back from auxiliary window 204. For example, the user may change an image from color (not shown) to black and white and from low contrast to a high contrast image. The user may also crop the image.

Figure 4:
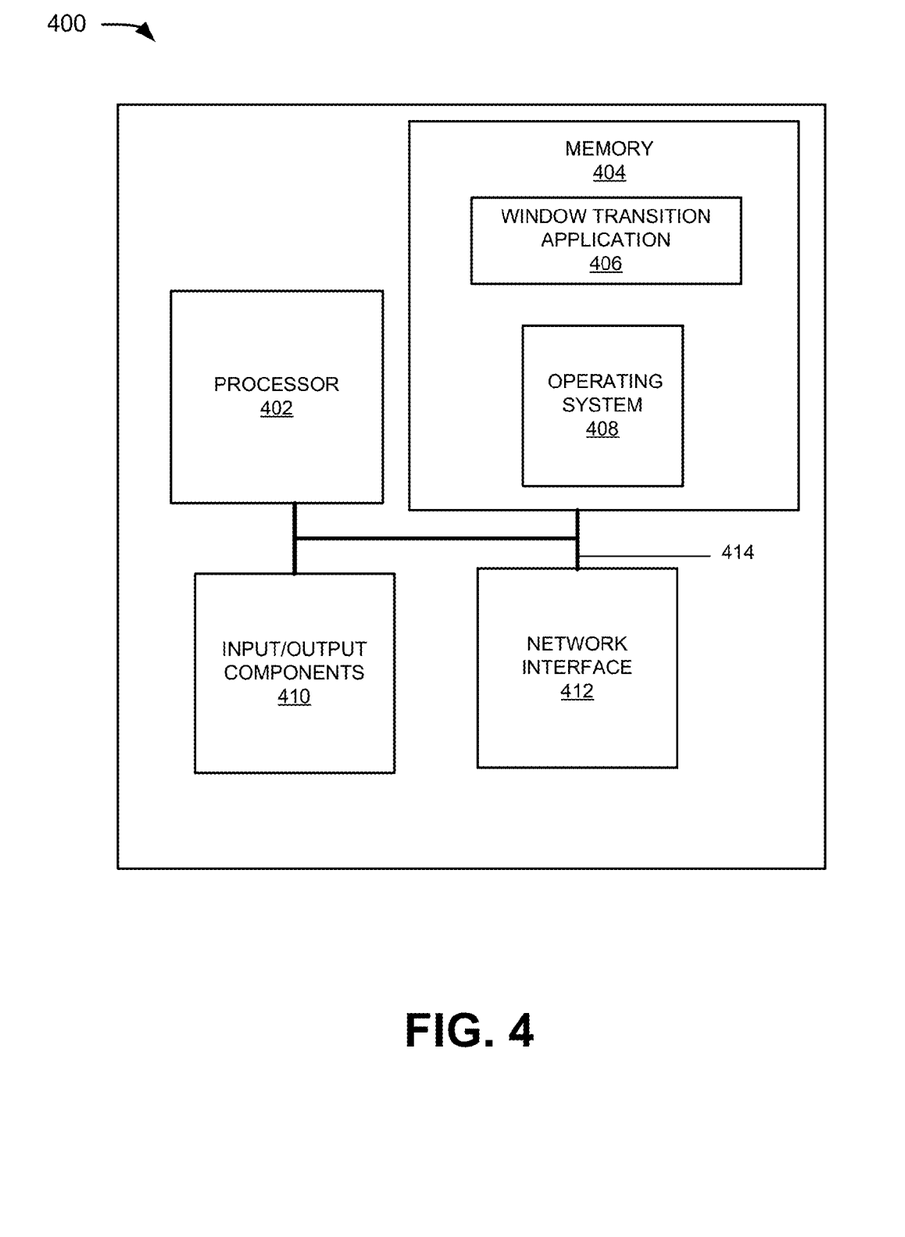
FIG. 4 illustrates an exemplary configuration of one or more of the components of FIG. 1.

FIG. 4 is a block diagram of exemplary components of device 400. Device 400 may represent components implemented or included within device 100. As shown in FIG. 4, device 400 may include a processor 402, a memory 404, input/output components 410, a network interface 412, and a communication path 414. In different implementations, device 400 may include additional, fewer, or different components than the ones illustrated in FIG. 3. For example, device 400 may include additional network interfaces, such as interfaces for receiving and sending data packets.

Processor 402 may include a processor, a microprocessor, an Application Specific Integrated Circuit (ASIC), a Field Programmable Gate Array (FPGA), and/or other processing logic (e.g., audio/video processor) capable of processing information and/or controlling device 400.

Memory 404 may include static memory, such as read only memory (ROM), and/or dynamic memory, such as random access memory (RAM), or onboard cache, for storing data and machine-readable instructions. Memory 404 may also include storage devices, such as a floppy disk, compact disc read only memory (CD ROM), compact disc (CD) read/write (R/W) disc, and/or flash memory, as well as other types of storage devices.

Memory 404 may store window transition application 306. Window transition application 306 may include machine-readable instructions that execute a transition from one application window to another application window, such as from start window 202 to auxiliary window 204 or from auxiliary window 204 to start window 202.

According to an implementation, window transition application 306 may also determine a transition from a current application window to a particular application window based on different input signals received via input/output components 410 (e.g., movement in one direction selects a particular application window while movement in the other direction selects a different application window). For example, a browser Web page may have multiple associated auxiliary windows 204, such as an auxiliary window 204 that includes hypertext markup language (HTML) code for the browser, Web site architecture, etc., and another auxiliary window 204 that may display browsing history, bookmarks, notes, etc., for the user.

Input/output components 410 may include a keyboard or keypad, voice recognition mechanisms, motion detectors, Universal Serial Bus (USB), speakers, a microphone, a stylus, and/or other types of components for providing an input/output signal to/from device 400.

Network interface 412 may include any transceiver-like mechanism that enables device 400 to communicate with other devices and/or systems. For example, network interface 412 may include mechanisms for communicating via a network, such as the Internet, a terrestrial wireless network (e.g., a wireless local area network (WLAN)), a cellular network, a satellite-based network, a wireless personal area network (WPAN), etc. Additionally or alternatively, network interface 412 may include a modem, an Ethernet interface to a LAN, and/or an interface/connection for connecting device 400 to other devices (e.g., a Bluetooth interface).

Communication path 414 may provide an interface through which components of device 400 may communicate with one another.

Figure 5:
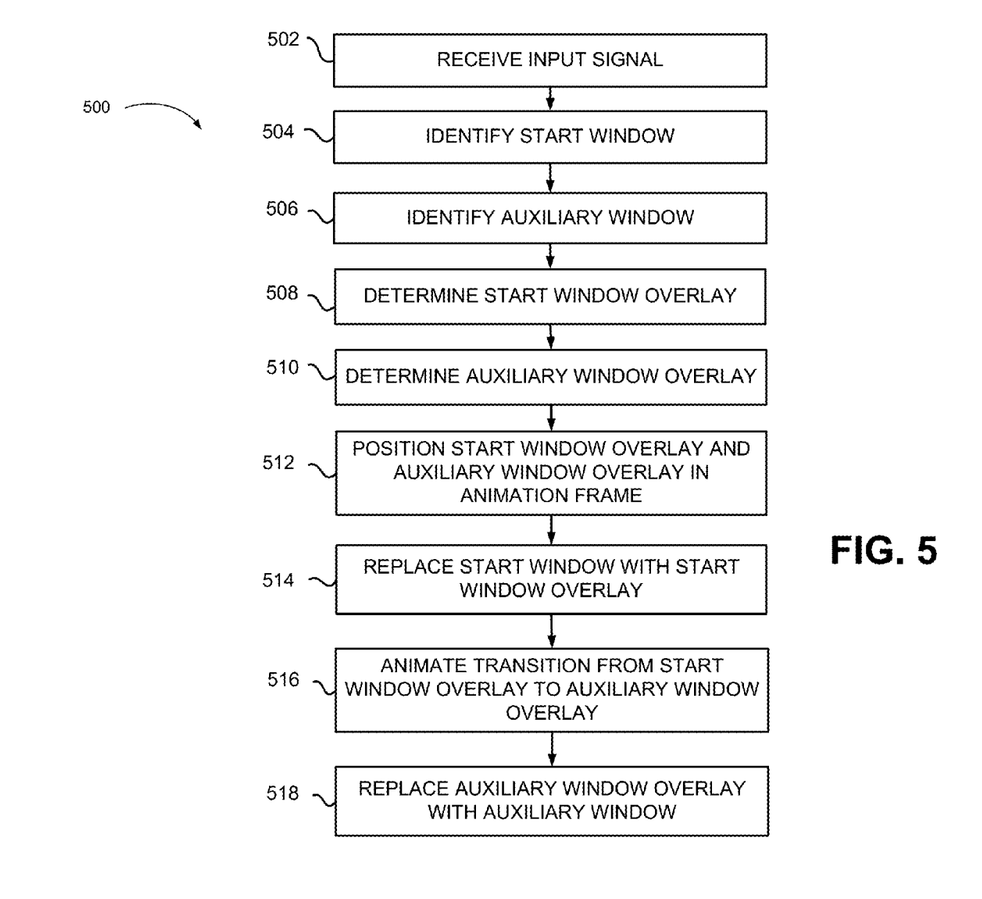
FIG. 5 is a flowchart of an exemplary process for providing a transition from a start window to an associated auxiliary window.

FIG. 5 is a flowchart of an exemplary process 500 for providing a transition from start window 202 to auxiliary window 204. Process 500 may execute in a device, such as device 100. It should be apparent that the process discussed below with respect to FIG. 5 represents a generalized illustration and that other elements may be added or existing elements may be removed, modified or rearranged without departing from the scope of the process 500.

Process 500 may begin with device 100 receiving an input signal associated with a request for a transition from start window 202 to auxiliary window 204 (block 502). Device 100 may receive the input signal when a user performs a procedure associated with the transition from start window 202 to auxiliary window 204. For example, device 100 may receive the input signal when a user clicks on or otherwise interacts with window transition button 210 in display 116 of device 100. Alternatively, motion detectors associated with device 100 may detect particular motion that corresponds to a request for a transition to auxiliary window 204, such as a motion of the user's hand from right to left in proximity of the motion sensors (i.e., simulating a turning of a page in a book).

According to another implementation, device 100 may receive multiple different input signals associated with transitions from start window 202 to different auxiliary windows 204. For example, start window 202 may include multiple transition buttons 210 (not shown) that each correspond to a different auxiliary window 204.

At block 504, device 100 may identify start window 202. Device 100 may identify start window 202 at approximately the time that the input signal is received. Device 100 may identify the configuration of layers in start window 202.

At block 506, device 100 may identify a target application window, in this instance auxiliary window 204. Device 100 may identify auxiliary window 204 based on the input signal. For example, auxiliary window 204 may be associated with window transition button 210.

At block 508, device 100 may determine a start window overlay 212 based on start window 202. Start window overlay 212 may be a visual duplicate of start window 202. Similarly, device 100 may determine an auxiliary window overlay 214 based on auxiliary window 204 (block 510).

At block 512, device 100 may position start window overlay 212 and auxiliary window overlay 214 in an animation frame 220. For example, device 100 may position auxiliary window overlay 214 behind start window overlay 212 using animation frame 220 as a frame of reference.

At block 514, device 100 may replace start window 202 with start window overlay 212. Device 100 replaces start window 202 with start window overlay 212. The user may not be able to visually detect the change because start window 202 and start window overlay 212 are visual duplicates.

At block 516, device 100 may execute an animated transition from start window overlay 212 to auxiliary window overlay 214. For example, device 100 may manipulate layers and/or sub-layers (i.e., layers that comprise a particular window or layer) of start window overlay 212 and auxiliary window overlay 214 to provide an animated visual effect of auxiliary window overlay 214 replacing start window overlay 212.

Auxiliary window 204 may replace auxiliary window overlay 214 (block 518). Auxiliary window 204 is visible from the user's perspective and provides functionality associated with auxiliary window 204, including user interface elements.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIG. 5, the order of the blocks may be modified in other implementations. Further, non-dependent blocks may be performed in parallel. It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to a transition between a start window and an associated auxiliary window, in other implementations, other types of transitions may be implemented between different application windows. Additionally, the input signal may be provided via different input components.

Further, certain portions of the invention may be implemented as a "component" that performs one or more functions. These components may include hardware, such as a processor, an ASIC, or a FPGA, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   displaying a start window on a display of a mobile device,
      wherein the start window is initially in an active state,
      wherein when the start window is displayed and in the active state, the start window provides functionality for an application via user interface elements displayed in the start window;
   receiving an input signal at a mobile device,
      wherein the input signal includes a request for an animated transition from a start window to one of at least one available auxiliary window,
      wherein each of the at least one available auxiliary window provides functionality, via user interface elements in the at least one available auxiliary window when the at least one available auxiliary window is in an active state, for changing settings for one or more elements associated with the application,
   identifying a directional component associated with the input signal;
   identifying the start window, wherein the start window is initially in the active state;
   identifying at least one selected auxiliary window from the at least one available auxiliary window based on the directional component, wherein the at least one selected auxiliary window is initially in an inactive state;
   determining a start window overlay based on a screen shot of the start window, wherein the start window overlay comprises a visual copy of the start window including the user interface elements in the start window;
   determining an auxiliary window overlay based on the at least one selected auxiliary window, wherein the auxiliary window overlay comprises a visual copy of the at least one selected auxiliary window including the user interface elements in the at least one selected auxiliary window; and
   performing the animated transition from the start window to the at least one selected auxiliary window in an active state, wherein performing the animated transition includes:
      replacing the start window with the start window overlay by displaying the start window overlay, wherein the start window becomes inactive when replaced by the start window overlay, and wherein when displaying the start window overlay, the functionality associated with the displayed user interface elements are not provided,
      positioning the start window overlay and the auxiliary window overlay in an animation frame,
      performing the animated transition from the start window overlay to the auxiliary window overlay in the animation frame and displaying the auxiliary window overlay, wherein when displaying the auxiliary window overlay, the functionality associated with the displayed user interface elements are not provided, and
      replacing the auxiliary window overlay with the at least one selected auxiliary window by displaying the at least one selected auxiliary window on the display, wherein the at least one selected auxiliary window becomes active when the auxiliary window overlay is replaced by the auxiliary window.

2. The computer-implemented method of claim 1, wherein performing the animated transition from the start window overlay to the auxiliary window overlay based on the animation frame includes creating an effect that the start window swivels on a fulcrum to reveal the at least one selected auxiliary window on the reverse side of the start window and the start window is replaced by the at least one selected auxiliary window.

3. The computer-implemented method of claim 2, wherein performing the animated transition from the start window overlay to the auxiliary window overlay includes animating the transition using one or more of Apple® application programming interfaces (APIs) and JavaScript APIs.

4. The computer-implemented method of claim 1, wherein the settings for the application associated with the start window include one or more of information related to the application included in the start window or control values for the application included in the start window.

5. The computer-implemented method of claim 4, wherein the start window comprises an image displayed by a digital photograph application and the control values in the identified at least one auxiliary window include contrast, brightness, sharpness, hue, and crop image.

6. The computer-implemented method of claim 4, wherein the start window is associated with a word processing application and the control values in the identified at least one auxiliary window include document format options.

7. The computer-implemented method of claim 1, wherein performing the animated transition from the start window to the at least one selected auxiliary window includes a visual effect of one or more of a page turning or a door opening.

8. The computer-implemented method of claim 1, wherein receiving the input signal includes identifying a receipt of a voice command.

9. The computer-implemented method of claim 1, wherein identifying the directional component further comprises:
   detecting motion associated with the mobile device based on motion sensors associated with the mobile device.

10. The computer-implemented method of claim 1, wherein identifying the directional component further comprises:
    detecting motion of a user within a field of detection that corresponds to a requested command.

11. The computer-implemented method of claim 1, wherein performing the animated transition from the start window to the at least one selected auxiliary window further comprises:
    performing the animated transition based on a model that simulates a visual representation of a physical response to the input signal.

12. The computer-implemented method of claim 1, wherein identifying a directional component associated with the input signal further comprises:
    identifying the directional component based on selection of at least one transition button associated with the at least one selected auxiliary window.

13. The computer-implemented method of claim 1, wherein receiving the input signal at the mobile device further comprises:
    receiving the input signal based on at least one transition button that corresponds to at least one selected auxiliary window.

14. A device, comprising:
    a memory to store a plurality of instructions;
    a display to display a start window, wherein the start window is initially in an active state, wherein when the start window is displayed and in the active state, the start window provides functionality for an application via user interface elements displayed in the start window; and a processor configured to execute instructions in the memory to:
   receive an input signal, wherein the input signal includes a request for an animated transition from a start window to at least one available auxiliary window, wherein the start window is associated with an application and each of the at least one available auxiliary window provides functionality, via user interface elements in the at least one available auxiliary window when the at least one available auxiliary window is in an active state, for changing settings for one or more elements associated with the application;
   identify a directional component associated with the input signal based on motion detected by motion sensors associated with the device;
   identify the start window, wherein the start window is initially in the active state;
   identify at least one selected auxiliary window based on the directional component, wherein the at least one selected auxiliary window is initially in an inactive state;
   determine a start window overlay based on a screen shot of the start window, wherein the start window overlay is a visual copy of the start window including the user interface elements in the start window;
   determine an auxiliary window overlay based on the at least one selected auxiliary window, wherein the auxiliary window overlay is a visual copy of the at least one selected auxiliary window including the user interface elements in the at least one selected auxiliary window; and
   perform the animated transition from the start window to the at least one selected auxiliary window, wherein the processor is configured to:
      replace the start window with the start window overlay by instructing the display of the start window overlay, wherein the start window becomes inactive when replaced by the start window overlay, and wherein when the start window overlay is displayed, the functionality associated with the displayed user interface elements is not provided,
      position the start window overlay and the auxiliary window overlay in an animation frame,
      perform the animated transition from the start window overlay to the auxiliary window overlay in the animation frame and instruct the display of the auxiliary window overlay, wherein when the auxiliary window overlay is displayed, the functionality associated with the displayed user interface elements is not provided, and
      replace the auxiliary window overlay with the at least one selected auxiliary window by instructing the display of the at least one selected auxiliary window on the display, wherein the at least one selected auxiliary window becomes active when the auxiliary window overlay is replaced by the auxiliary window.

15. The device of claim 14, the processor is further configured to:
   perform the animated transition from the start window overlay to the auxiliary window overlay by creating effect that the start window swivels on a fulcrum to reveal the at least one selected auxiliary window on the reverse side of the start window and the start window is replaced by the at least one selected auxiliary window.

16. The device of claim 14, wherein the processor is further configured to determine an adjustable property of one or more elements in the start window based on a control value included in the at least one selected auxiliary window.

17. A non-transitory computer-readable medium including instructions to be executed by a processor, the instructions including one or more instructions, when executed by the processor, for causing the processor to:
   instruct the display to display a start window, wherein the start window is initially in an active state, wherein when the start window is displayed and in the active state, the start window provides functionality for an application via user interface elements displayed in the start window;
   receive an input signal at a mobile device, wherein the input signal includes a request for an animated transition from a start window to one of at least one available auxiliary window, wherein the start window is associated with an application and each of the at least one available auxiliary window provides functionality, via user interface elements in the at least one available auxiliary window when the at least one available auxiliary window is in an active state, for changing settings for one or more elements associated with the application;
   identify a directional component associated with the input signal based on motion detected by motion sensors associated with the mobile device;
   identify the start window, wherein the start window is initially in the active state;
   identify at least one selected auxiliary window from the at least one available auxiliary window based on the directional component, wherein the at least one selected auxiliary window is initially in an inactive state;
   determine a start window overlay based on a screen shot of the start window, wherein the start window overlay is a visual copy of the start window including the user interface elements in the start window;
   determine an auxiliary window overlay based on the at least one selected auxiliary window, wherein the auxiliary window overlay is a visual copy of the at least one selected auxiliary window including the user interface elements in the at least one selected auxiliary window;
   replace the start window with the start window overlay by instructing the display of the start window overlay, wherein the start window becomes inactive when replaced by the start window overlay, and wherein when the start window overlay is displayed, the functionality associated with the displayed user interface elements is not provided;
   position the start window overlay and the auxiliary window overlay in an animation frame;
   perform the animated transition from the start window overlay to the auxiliary window overlay based in the animation frame and instruct the display of the auxiliary window overlay, wherein when the auxiliary window overlay is displayed, the functionality associated with the displayed user interface elements is not provided; and
   replace the auxiliary window overlay with the at least one selected auxiliary window by instructing the display of the at least one selected auxiliary window on the display, wherein the at least one selected auxiliary window becomes active when the auxiliary window overlay is replaced by the auxiliary window.

18. The non-transitory computer-readable medium of claim 17, wherein the settings for the application associated with the start window include one or more of information related to the application included in the start window or control values for the application included in the start window.

19. The non-transitory computer-readable medium of claim 17, wherein, when performing the animated transition from the start window overlay to the auxiliary window overlay, the one or more instructions further includes instructions for causing the processor to:
   transition based on a visual effect of one or more of a page turning or a door opening, or
   transition to create an effect that the start window swivels on a fulcrum to reveal the at least one selected auxiliary window on the reverse side of the start window.

20. The non-transitory computer-readable medium of claim 17, wherein, receiving the input signal includes identifying a receipt of a voice command.

\* \* \* \* \*